(12) United States Patent
Wang et al.

(10) Patent No.: US 12,214,839 B2
(45) Date of Patent: Feb. 4, 2025

(54) SADDLE WITH WATER BOTTLE (71) Applicant: ROYALBABY CYCLE BEIJING CO., LTD., Beijing (CN)

(72) Inventors: Yixiong Wang, Beijing (CN); Zhiwei Chao, Beijing (CN)

(73) Assignee: ROYALBABY CYCLE BEIJING CO., LTD., Beijing (CN)

(*) Notice: Subject to any disclaimer, the term of this patent is extended or adjusted under 35 U.S.C. 154(b) by 115 days.

(21) Appl. No.: 18/100,365

(22) Filed: Jan. 23, 2023

(65) Prior Publication Data
US 2023/0278655 A1 Sep. 7, 2023

(30) Foreign Application Priority Data
Mar. 3, 2022 (CN) .......................... 202220469495.2

(51) Int. Cl.
*B62J 1/00* (2006.01)
*B62J 1/08* (2006.01)
*B62J 1/28* (2006.01)
*B62J 11/04* (2020.01)
*B62J 9/26* (2020.01)

(52) U.S. Cl.
CPC . *B62J 1/28* (2013.01); *B62J 1/08* (2013.01); *B62J 11/04* (2020.02); *B62J 1/00* (2013.01); *B62J 9/26* (2020.02)

(58) Field of Classification Search
CPC ................. B62J 1/00; B62J 9/26; B62J 11/04
See application file for complete search history.

(56) References Cited

U.S. PATENT DOCUMENTS

| | | | | |
|---|---|---|---|---|
| 5,190,345 A | * | 3/1993 | Lin | B62J 9/26 224/427 |
| 5,496,089 A | * | 3/1996 | Muderlak | B62J 9/26 224/427 |
| 5,655,694 A | * | 8/1997 | Keckeisen | B62J 9/26 224/430 |
| 6,953,135 B2 | * | 10/2005 | Litton | B62J 9/26 224/427 |
| 7,264,308 B2 | * | 9/2007 | Bigolin | B62J 9/27 297/188.12 |
| 7,712,827 B2 | * | 5/2010 | Yu | B62J 1/002 224/427 |
| 7,866,744 B2 | * | 1/2011 | Bigolin | B62J 1/00 297/215.1 |

(Continued)

FOREIGN PATENT DOCUMENTS

| CN | 204236654 U | 4/2015 |
|---|---|---|
| CN | 206954361 U | 2/2018 |

(Continued)

*Primary Examiner* — Syed A Islam
(74) *Attorney, Agent, or Firm* — Burris Law, PLLC (57) ABSTRACT

The present application relates to a saddle, in particular to a saddle with a water bottle. The saddle with the water bottle adopts the following technical solution: the saddle includes a saddle body and a water bottle body, the saddle body is provided with an accommodating cavity allowing the water bottle body to be inserted thereto, and the water bottle body is fixed in position relative to the saddle body after being inserted into the accommodating cavity. The space taken up by the water bottle placed between the saddle and the front wheel is saved.

7 Claims, 8 Drawing Sheets

(56) References Cited

U.S. PATENT DOCUMENTS

| | | | | |
|---|---|---|---|---|
| 8,757,413 | B1* | 6/2014 | Kephart | B62J 9/22 206/804 |
| 8,777,075 | B2* | 7/2014 | Bretl | B62J 9/21 224/148.2 |
| 10,183,716 | B2* | 1/2019 | Chuang | B62J 9/27 |
| 10,308,303 | B2* | 6/2019 | Chuang | B62J 9/26 |
| 10,343,738 | B2* | 7/2019 | Chuang | B62J 11/04 |
| 11,453,451 | B2* | 9/2022 | Bogenschuetz | B62J 1/28 |
| 11,912,365 | B2* | 2/2024 | Bogenschutz | B62J 11/04 |
| 11,964,723 | B2* | 4/2024 | Chuang | B62J 9/27 |
| 2009/0039125 | A1* | 2/2009 | Bock | B62J 9/26 248/222.11 |
| 2018/0037285 | A1 | 2/2018 | Chuang | |
| 2018/0037286 | A1 | 2/2018 | Chuang | |

FOREIGN PATENT DOCUMENTS

| | | |
|---|---|---|
| CN | 109421843 A | 3/2019 |
| CN | 213502695 U | 6/2021 |
| DE | 202011051372 U1 | 1/2012 |
| EP | 3303110 B1 | 4/2021 |
| JP | 2008513284 A | 5/2008 |

\* cited by examiner

SADDLE WITH WATER BOTTLE

CROSS REFERENCE TO RELATED APPLICATION

This patent application claims the benefit and priority of Chinese Patent Application No. 202220469495.2, filed on Mar. 3, 2022, the disclosure of which is incorporated by reference herein in its entirety as part of the present application.

FIELD

The present application relates to a saddle, in particular to a saddle with a water bottle.

BACKGROUND

With the improvement of people's living standards, bicycles have become a travel mode preferred by many people to take transportation or travel because of their advantages such as convenience, flexibility, economical efficiency, fashionability and environmental-protection property.

A bicycle in the related art includes a frame, a saddle, and a seat post formed on the frame for mounting the saddle, wherein the frame is located between a front wheel and the saddle of the bicycle; in a case that it is necessary to equip the bicycle with a water bottle, a water bottle holder for receiving the water bottle is usually mounted on the frame.

With regard to the above-mentioned relevant technical solution, the inventors have found that: during riding, a rider usually needs sufficient space between the saddle and the front wheel for leg movement, however, due to the arrangement of the water bottle between the saddle and the front wheel, part of the space between the saddle and the front wheel is taken up, which may interfere with the rider's leg movement.

SUMMARY

In order to save space taken up by a water bottle placed between a saddle and a front wheel, the present application provides a saddle with a water bottle.

A saddle with a water bottle provided by the present application adopts the following technical solution:

a saddle with a water bottle includes a saddle body and a water bottle body, the saddle body is provided with an accommodating cavity allowing the water bottle body to be inserted thereto, and the water bottle body is fixed in position relative to the saddle body after being inserted into the accommodating cavity.

By adopting the above-mentioned technical solution, the accommodating cavity allows the water bottle body to be mounted on the saddle body, thereby achieving the integrated arrangement of the water bottle and the saddle and preventing the water bottle body from taking up the space between the saddle body and the front wheel.

Optionally, the saddle body includes at least one supporting rod, and the water bottle body is concavely formed with a supporting hole allowing the supporting rod to be inserted thereto.

By adopting the above-mentioned technical solution, when the water bottle body is inserted into the accommodating cavity, the supporting rod is inserted into the supporting hole, and thus, the water bottle body is supported and fixed in the vertical direction.

Optionally, the supporting rod inclines upwards in a direction from a front end of the saddle body to a rear end of the saddle body, the saddle body is provided with a supporting surface which is located on a side where a lower end of the supporting rod faces away from an upper end of the supporting rod, and after the supporting rod is inserted into the supporting hole, one side of the water bottle body abuts against the supporting surface.

By adopting the above-mentioned technical solution, the supporting rod is disposed to be inclined, thereby cooperating with the supporting surface to support and restrain the water bottle body in the horizontal direction while supporting and fixing the water bottle body in the vertical direction.

Optionally, an end portion of the supporting rod is formed with a snap protrusion, a wall of the supporting hole is concavely formed with a snap groove allowing the snap protrusion to be embedded thereinto, and the supporting rod moves the snap protrusion to be embedded into the snap groove or out of the snap groove by deformation.

By adopting the above-mentioned technical solution, after the supporting rod is completely inserted into the supporting hole, the cooperation of the snap protrusion and the snap groove restrains the movement of the supporting rod in the supporting hole, so that the water bottle body is prevented from falling off from the saddle body when the bicycle jolts; and when it needs to remove the water bottle body from the saddle body, the water bottle body is pulled in a direction away from the supporting surface, during which the supporting rod elastically deforms so that the snap protrusion is removed from the interior of the snap groove.

Optionally, the saddle body includes a connecting strip for fixing the supporting rod, the water bottle body is provided with an avoidance hole allowing the connecting strip to be inserted into, the avoidance hole is in communication with the supporting hole, and a width of the avoidance hole is less than a width of the supporting hole.

By adopting the above-mentioned technical solution, the cooperation of the connecting strip and the avoidance hole restrains the position of the water bottle body in the horizontal direction which is perpendicular to a direction from the front wheel to the rear wheel; in addition, the width of the avoidance hole is smaller than the width of the supporting hole, so that the supporting rod is prevented from passing through the avoidance hole.

Optionally, the saddle body includes a saddle tree and a connecting plate fixed on the saddle tree, a handle is formed on the connecting plate, and the supporting rod is formed on the saddle tree or the connecting plate.

By adopting the above-mentioned technical solution, the handle is provided to facilitate a rider to lift and move the bicycle.

Optionally, the supporting rod is located below the connecting plate, the supporting rod is formed on the saddle tree, and the connecting plate is provided with a rod-passing hole allowing the supporting rod to pass through.

By adopting the above-mentioned technical solution, when the connecting plate is to be fixed to the saddle tree, the connecting plate is moved to gradually get close to the saddle tree, and at the same time, the supporting rod passes through the rod-passing hole, and finally, the connecting plate is fixed to the saddle tree by means of screws.

Optionally, clamping pieces are formed on a side of the saddle tree close to the connecting plate, the connecting plate is provided with clamping grooves allowing the clamping pieces to be inserted thereto, and after being inserted into the clamping grooves, the clamping pieces prevent the connecting plate and the saddle tree from being separated from each other in a vertical direction.

By adopting the above-mentioned technical solution, the clamping pieces and the clamping grooves cooperate to bear a part of tensile load generated when the connecting plate and the saddle tree are separated from each other, thereby reducing the number of the screws used for the saddle tree and the connecting plate.

Optionally, a mounting tube allowing a seat post to be inserted into is formed on a bottom of the saddle tree, a mounting ring plate disposed to be coaxial with the mounting tube is formed on the connecting plate, and one side of the mounting ring plate is open to allow the mounting tube to enter; and the mounting tube is fixedly connected to the mounting ring plate.

By adopting the above-mentioned technical solution, the mounting ring plate and the mounting tube are fixed to each other to bear a part of load generated in the vertical or horizontal direction when the connecting plate and the saddle tree are separated from each other, thereby reducing the number of the screws used for the saddle tree and the connecting plate.

In summary, the present application has the following technical effects.

1. With the accommodating cavity, the supporting rod, the supporting surface, and the snap protrusion, the integrated arrangement of the water bottle body and the saddle body is achieved, and the water bottle body is prevented from taking up the space between the saddle body and the front wheel.

2. With the clamping pieces or the mounting tube, or by fixing the saddle tree and the connecting plate completely using the screws, the integrated arrangement of the handle and the saddle body is achieved.

List of reference numerals: 1, saddle body; 2, water bottle body; 3, accommodating cavity; 4, supporting rod; 5, supporting hole; 6, supporting surface; 7, snap protrusion; 8, snap groove; 9, connecting strip; 10, avoidance hole; 11, connecting plate; 12, handle; 13, rod-passing hole; 14, transition groove; 15, overlapping groove; 16, connecting portion; 17, overlapping portion; 18, mounting tube; 19, mounting ring plate; 20, saddle tree; 21, saddle surface; 22, saddle shell.

DETAILED DESCRIPTION

In the description of the present application, it should be noted that terms "front end", "rear end", "vertical", "horizontal", "close to", "away from", etc. are based on opposite relationships as shown in the accompanying drawings and are merely intended to facilitate description of the present invention and simplify the description, rather than indicating or implying that a referred process or module has to be in a particular direction, state, and operation so as not to be construed as limiting the present invention.

The present application will be described in further detail below with reference to the accompanying drawings.

Embodiment 1

It is now defined that the end of a saddle close to a front wheel is a front end of the saddle, and the end of the saddle close to a rear wheel is a rear end of the saddle; and a water bottle is provided with a mouthpiece, and the end of the water bottle facing away from the mouthpiece is a bottom surface of the water bottle.

Figure 1:
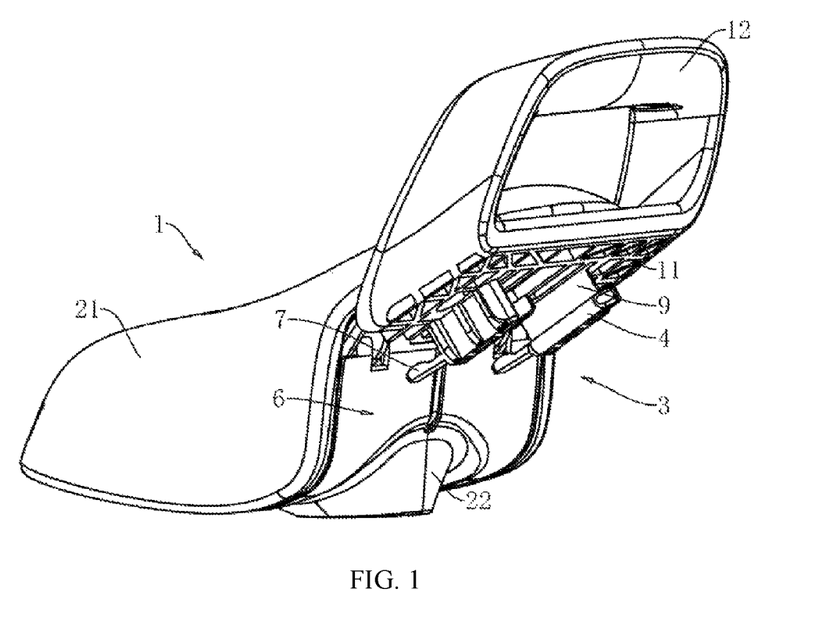
FIG. 1 is a schematic diagram showing a structure of a saddle in Embodiment 1, in which a water bottle body is not shown.
Figure 2:
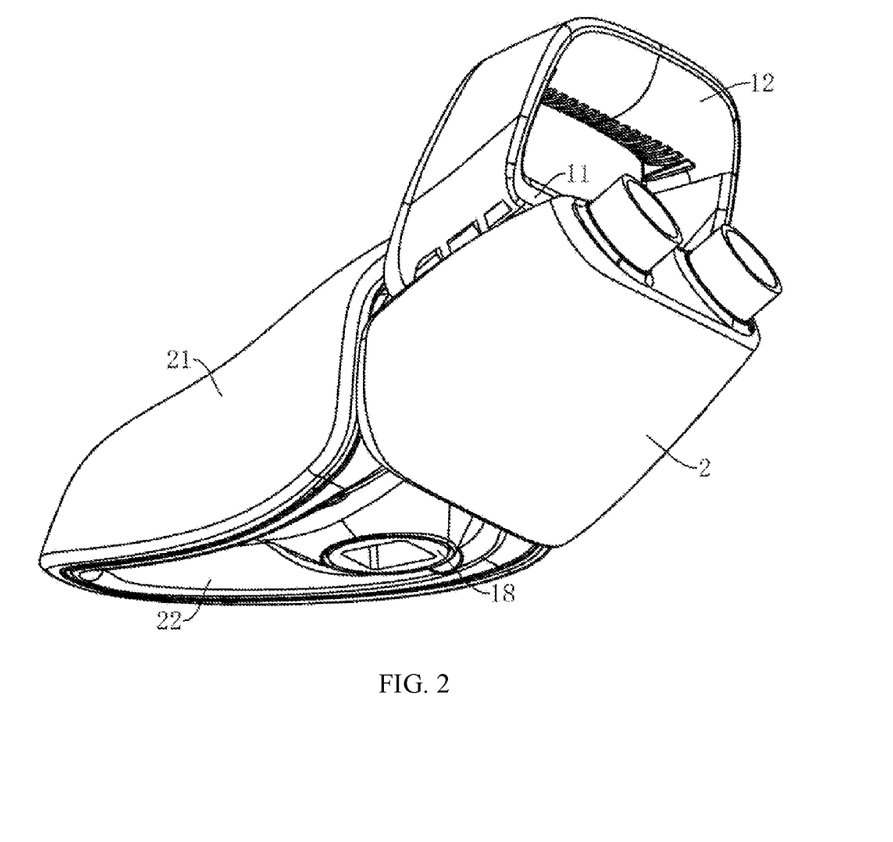
FIG. 2 is a schematic diagram showing an overall structure of the saddle in Embodiment 1.

With reference to FIG. 1 and FIG. 2, the present application provides a saddle with a water bottle, including a saddle body 1 mounted on a seat post and a water bottle body 2 which may be mounted on the saddle body 1, a rear end of the saddle body 1 is provided with an accompanying cavity 3 for accompanying the water bottle body 2, such that the water bottle body 2 will be mounted on the rear end of the saddle body 1, which saves space taken up between the saddle body 1 and the front wheel; and the water bottle body 2 is provided with a mouthpiece which is located on the side of the water bottle body 2 facing away from the saddle body 1.

Figure 3:
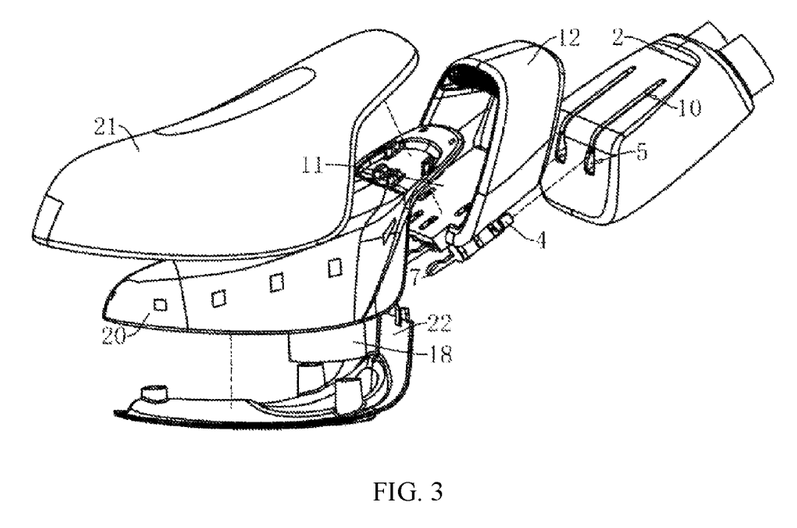
FIG. 3 is a schematic diagram showing an exploded mounting structure of the saddle in Embodiment 1.

With reference to FIG. 1 and FIG. 3, specifically, the saddle body 1 includes a saddle tree 20, a handle 12 mounted above the saddle tree 20 and disposed close to the rear end of the saddle body 1, a saddle surface 21 fixed on the upper surface of the saddle tree 20, and a saddle shell 22 screwed and snap-fitted on the lower surface of the saddle tree 20; the accommodating cavity 3 is located below the handle 12; a connecting plate 11 is disposed between the handle 12 and the saddle tree 20, the connecting plate 11 is integrally formed with the handle 12, and the connecting plate 11 is fixed on the saddle tree 20 so that the handle 12 and the saddle tree 20 are fixed; and the saddle tree 20 includes a mounting tube 18 allowing the seat post to be inserted into, and the mounting tube 18 is disposed through the saddle shell 22.

Figure 4:
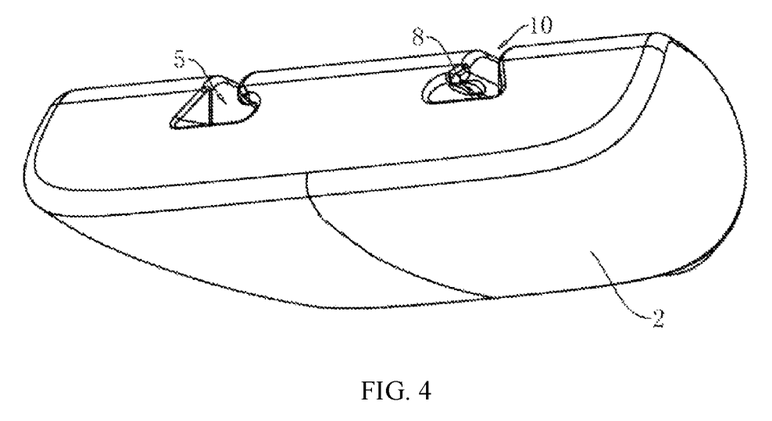
FIG. 4 is a schematic diagram showing a structure of the water bottle body in Embodiment 1.

With reference to FIG. 3 and FIG. 4, the lower surface of the connecting plate 11 is formed with a connecting strip 9 and a supporting rod 4. The supporting rod 4 is located on the side of the connecting strip 9 facing away from the connecting plate 11, and there is a distance between the supporting rod 4 and the connecting plate 11. The water bottle body 2 is concavely formed with a supporting hole 5 allowing the supporting rod 4 to be adaptively inserted thereto and an avoidance hole 10 allowing the connecting strip 9 to be adaptively inserted thereto. The avoidance hole 10 and the supporting hole 5 are in communication with each other, and both of the supporting hole 5 and the avoidance hole 10 pass through the bottom surface of the water bottle body 2. The avoidance hole 10 also passes through one of sides of the water bottle body 2, and the width of the avoidance hole 10 is less than the width of the supporting hole 5. The supporting rod 4 is disposed to incline upwards in a direction from a front end of the saddle body 1 to a rear end of the saddle body 1. The rear end of the saddle shell 22 is a supporting surface 6 which is disposed vertically or disposed to incline upwards in the direction from the front end of the saddle body 1 to the rear end of the saddle body 1, and after the supporting rod 4 is completely inserted into the supporting hole 5, the bottom surface of the water bottle body 2 abuts against the supporting surface 6.

When the water bottle body 2 is to be mounted on the saddle body 1, the water bottle is placed into the accommodating cavity 3, during which the bottom surface of the water bottle gradually gets close to the supporting surface 6, the connecting plate 11 moves in the avoidance hole 10, and the supporting rod 4 gradually penetrates into the supporting hole 5 until the supporting rod 4 is completely inserted into the supporting hole 5 and the bottom surface of the water bottle abuts against the supporting surface 6. The supporting rod 4 cooperates with the supporting hole 5 to fix the water bottle body 2 relative to the saddle body 1 in the vertical direction and the horizontal direction.

Figure 5:
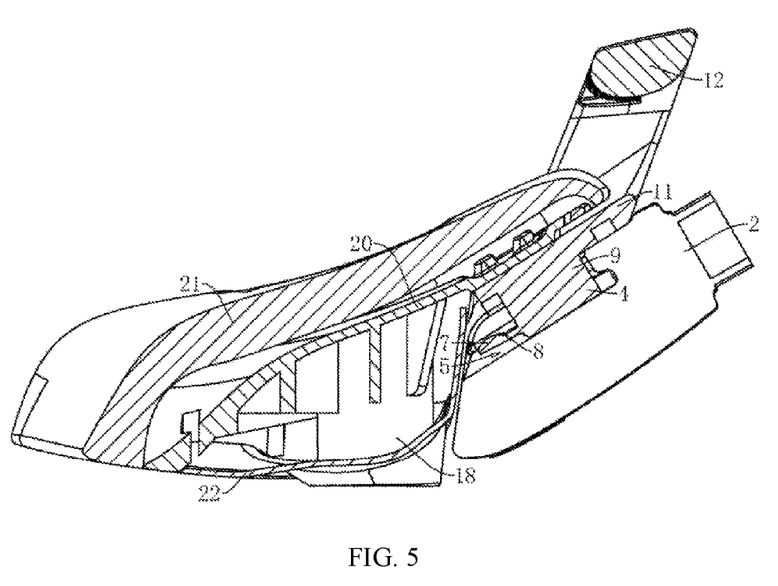
FIG. 5 is a schematic diagram showing a section of the saddle in Embodiment 1.

With reference to FIG. 4 and FIG. 5, further, a lower end of the supporting rod 4 is formed with a snap protrusion 7 protruding upwards, and the thickness of the lower end of the supporting rod 4 is less than the thickness of an upper end of the supporting rod 4. The upper hole wall of the supporting hole 5 is provided with a snap groove 8 allowing the snap protrusion 7 to be embedded thereinto. Due to a difference in the thickness of the supporting rod 4, when the snap protrusion 7 does not enter the snap groove 8, the supporting rod 4 can gradually penetrate along an extension direction of the supporting hole 5. When the snap protrusion 7 intends to enter the snap groove 8, the supporting rod 4 at the position of the snap protrusion 7 deforms downwards until the snap protrusion 7 completely enters the snap groove 8. The cooperation of the snap protrusion 7 and the snap groove 8 restrains the movement of the supporting rod 4 inside the supporting hole 5, so that the water bottle body 2 is prevented from falling off from the saddle body 1 when the bicycle jolts. When it needs remove the water bottle body 2 from the saddle body 1, the water bottle body 2 is pulled in a direction away from the supporting surface 6, during which the supporting rod 4 elastically deforms so that the snap protrusion 7 is removed from the interior of the snap groove 8.

With reference to FIG. 2, the saddle body 1 and the water bottle body 2 in the present application form a "rocket"-like structure, which improves the aesthetic appearance of the bicycle.

Embodiment 2

Figure 6:
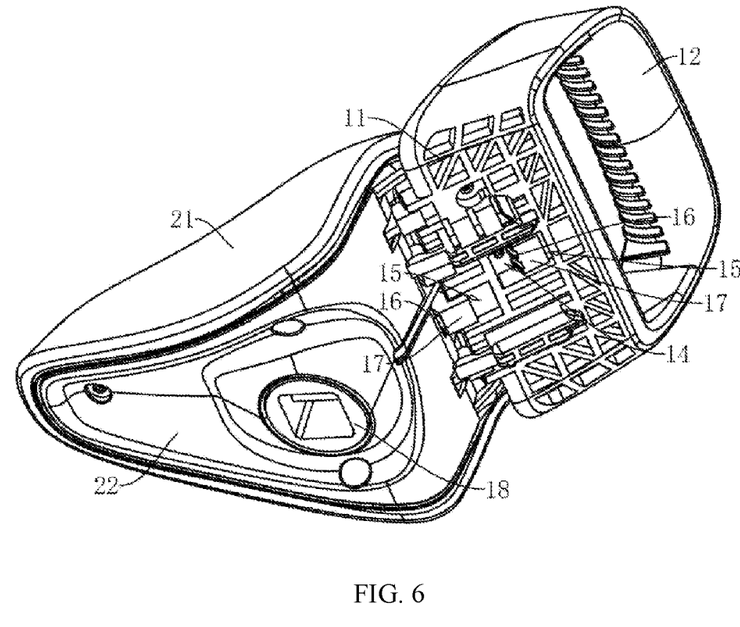
FIG. 6 is a schematic diagram showing a structure of a saddle in Embodiment 2, in which a water bottle body is not shown.
Figure 7:
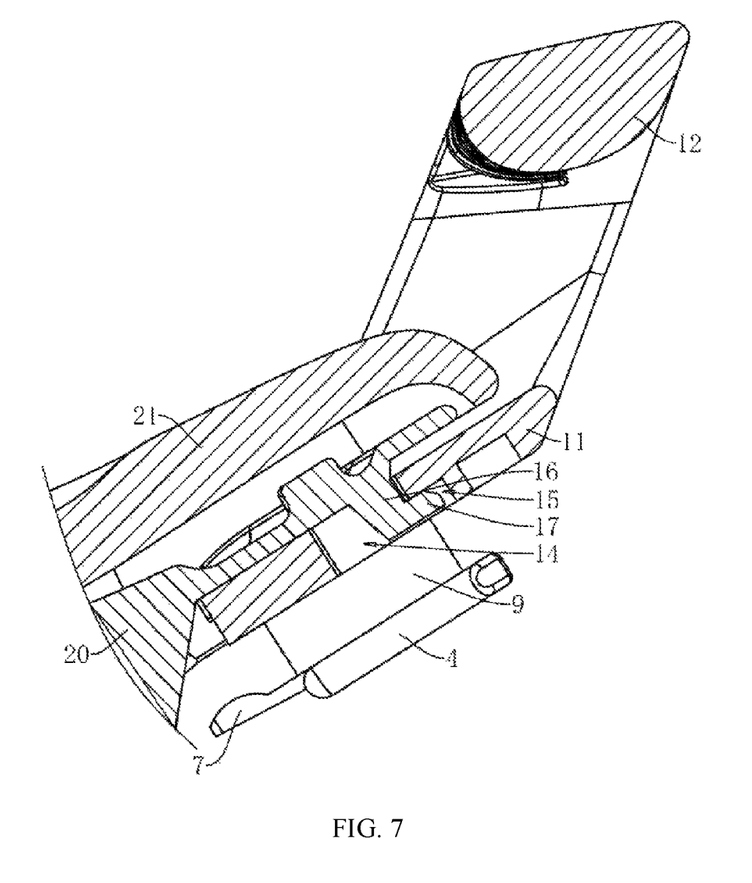
FIG. 7 is a schematic diagram showing a local section of the saddle in Embodiment 2.

With reference to FIG. 6 and FIG. 7, the present embodiment differs from Embodiment 1 in that the saddle tree 20 and the connecting plate 11 are mounted in a different manner. In the present embodiment, a plurality of clamping pieces are formed on the saddle tree 20, and the connecting plate 11 is provided with a plurality of clamping grooves allowing the clamping pieces to be inserted thereto in one-to-one correspondence. The clamping pieces are embedded into the clamping grooves so as to bear a part of load generated when the connecting plate 11 and the saddle tree 20 are separated from each other, thereby reducing the number of screws used for the saddle tree 20 and the connecting plate 11.

Specifically, some of the clamping grooves are formed at the edge of the connecting plate 11, and these clamping grooves are overlapping grooves 15 passing through the edge of the connecting plate 11. Each of the clamping pieces includes a connecting portion 16 formed on the saddle tree 20 and an overlapping portion 17 formed on the side of the connecting portion 16 facing away from the saddle tree 20. The overlapping portion 17 and the connecting portion 16 form an L-shaped structure. The overlapping portion 17 is embedded into the overlapping groove 15 while the edge of the connecting plate 11 abuts against the connecting portion 16, and thus, the connecting plate 11 and the saddle tree 20 are locally positioned.

In addition, at least one clamping groove is formed in the middle position of the connecting plate 11. The clamping groove consists of a transition groove 14 and the overlapping groove 15 which are in communication with each other. The transition groove 14 passes through the connecting plate 11 and allows the clamping pieces to pass through, and the overlapping groove 15 passes through the lower surface of the connecting plate 11 and allows the overlapping portion 17 to be embedded thereinto. In a process of mounting the connecting plate 11 on the saddle tree 20, firstly, the connecting plate 11 is moved in a direction close to the saddle tree 20, and the overlapping portion 17 and a transition portion pass through the transition groove 14; then, the connecting plate 11 is translated, so that the overlapping portion 17 continuously moves to the interior of the overlapping groove 15; and finally, the connecting plate 11 and the saddle tree 20 are further fixed using screws the number of which is fewer than that in Embodiment 1.

Embodiment 3

Figure 8:
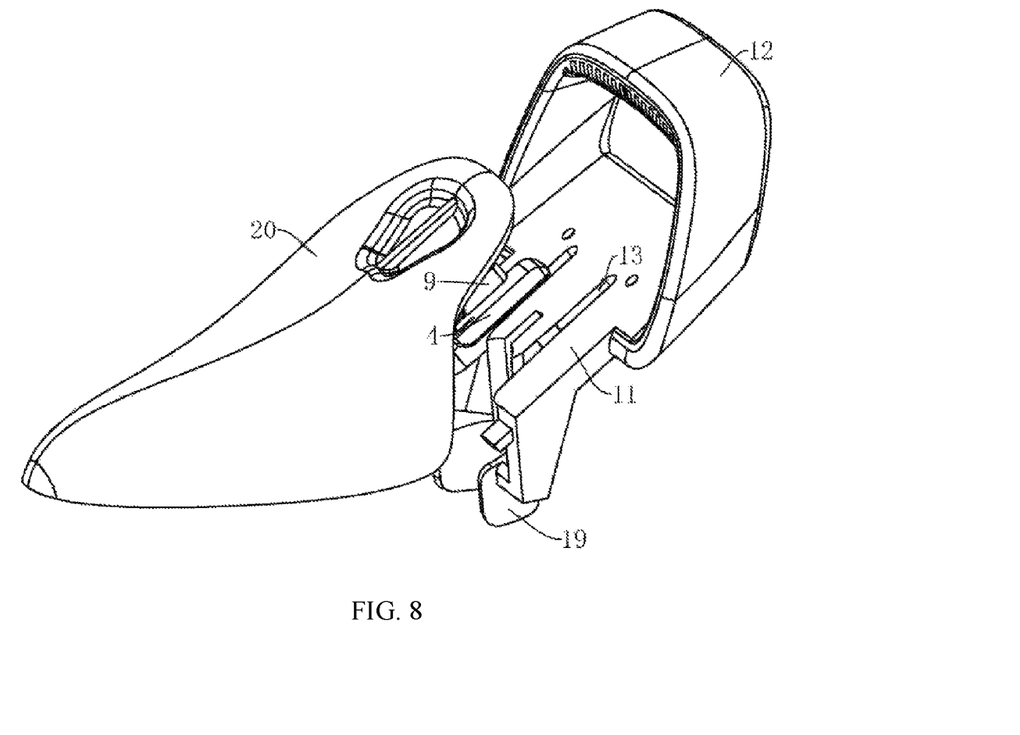
FIG. 8 is a schematic diagram showing an exploded mounting structure of a saddle in Embodiment 3, in which a water bottle body is not shown.
Figure 9:
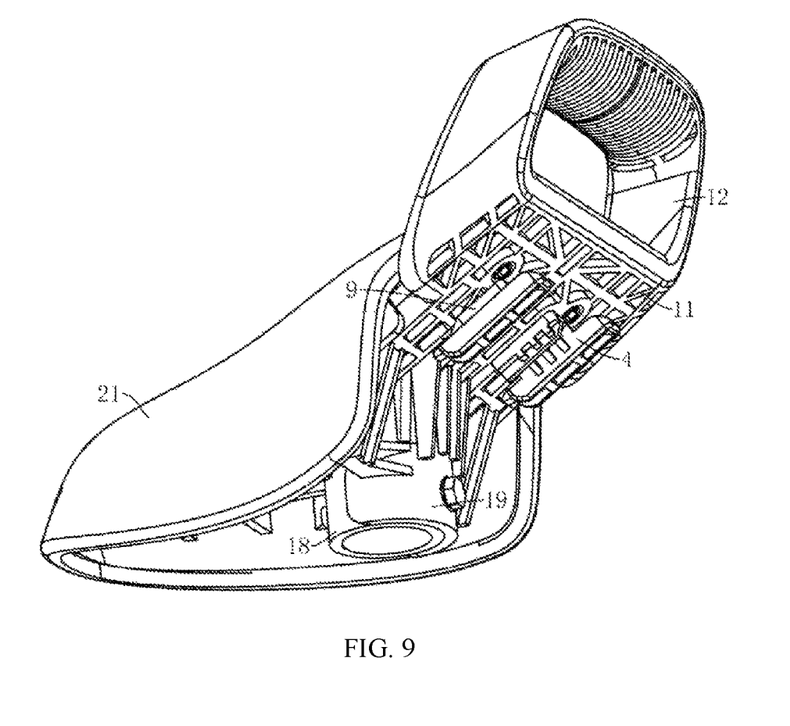
FIG. 9 is a schematic diagram showing a structure of the saddle in Embodiment 3, in which a water bottle body is not shown.

With reference to FIG. 8 and FIG. 9, the present embodiment differs from Embodiment 1 in that the connecting strip 9 is formed at a different position, and the saddle tree 20 and the connecting plate 11 are mounted in a different manner.

In the present embodiment, the connecting strip 9 is formed on the lower surface of the saddle tree 20, and the connecting plate 11 is provided with a rod passing hole 13 allowing the connecting strip 9 and the supporting rod 4 to reach the downside of the connecting plate 11. When the connecting plate 11 is to be mounted on the saddle tree 20, firstly, the connecting plate 11 is moved in a direction close to the saddle tree 20, and the connecting strip 9 and the supporting rod 4 are moved to the downside of the connecting plate 11 through the rod passing hole 13; and then, the connecting plate 11 is fixed on the saddle tree 20 by means of screws, so that the position of the supporting rod 4 relative to the connecting plate 11 is the same as that in Embodiment 1.

In addition, in the present embodiment, a mounting ring plate 19 disposed to be coaxial with the mounting tube 18 is formed on the connecting plate 11, the side of the mounting ring plate 19 close to the front end of the saddle tree 20 is open to allow the mounting tube 18 to enter the mounting ring plate 19, and the mounting ring plate 19 and the mounting tube 18 are fixed by means of a bolt screwed in a radial direction. The mounting ring plate 19 and the mounting tube 18 are fixed to each other to bear a part of load generated in the vertical or horizontal direction when the connecting plate 11 and the saddle tree 20 are separated from each other, thereby reducing the number of the screws used for the saddle tree 20 and the connecting plate 11.

The particular embodiment is merely an explanation for the present application and is not a limitation on the present application. A person skilled in the art, after reading the present specification, would have made an amendment to the present embodiment as required without any inventive contribution, but the present application is protected by the patent laws insofar as it is within the scope of the claims of the present application.

What is claimed is:

1. A saddle with a water bottle, comprising a saddle body and a water bottle body, wherein the saddle body is provided with an accommodating cavity allowing the water bottle body to be inserted thereto and comprises at least one support rod, and the water bottle body is fixed in position relative to the saddle body after being inserted into the accommodating cavity and concavely formed with a supporting hole allowing the supporting rod to be inserted thereto, the at least one supporting rod inclines upwards in a direction from a front end of the saddle body to a rear end of the saddle body, the saddle body is provided with a supporting surface which is located on a side where a lower end of the supporting rod faces away from an upper end of the supporting rod, and after the at least one supporting rod is inserted into the supporting hole, one side of the water bottle body abuts against the supporting surface.

2. The saddle with the water bottle of claim 1, wherein an end portion of the supporting rod is formed with a snap protrusion, a wall of the supporting hole is concavely formed with a snap groove allowing the snap protrusion to be embedded thereinto, and the supporting rod moves the snap protrusion to be embedded into the snap groove or out of the snap groove by deformation.

3. The saddle with the water bottle of claim 1, wherein the saddle body comprises a connecting strip for fixing the supporting rod, the water bottle body is provided with an avoidance hole allowing the connecting strip to be inserted thereto, the avoidance hole is in communication with the supporting hole, and a width of the avoidance hole is less than a width of the supporting hole.

4. The saddle with the water bottle of claim 1, wherein the saddle body comprises a saddle tree and a connecting plate fixed on the saddle tree, a handle is formed on the connecting plate, and the supporting rod is formed on the saddle tree or the connecting plate.

5. The saddle with the water bottle of claim 4, wherein the supporting rod is located below the connecting plate, the supporting rod is formed on the saddle tree, and the connecting plate is provided with a rod passing hole allowing the supporting rod to pass through.

6. The saddle with the water bottle of claim 4, wherein clamping pieces are formed on a side of the saddle tree close to the connecting plate, the connecting plate is provided with clamping grooves allowing the clamping pieces to be inserted thereto, and after being inserted into the clamping grooves, the clamping pieces prevent the connecting plate and the saddle tree from being separated from each other in a vertical direction.

7. The saddle with the water bottle of claim 4, wherein a mounting tube allowing a seat post to be inserted thereto is formed on a bottom of the saddle tree, a mounting ring plate disposed to be coaxial with the mounting tube is formed on the connecting plate, and one side of the mounting ring plate is open to allow the mounting tube to enter; and the mounting tube is fixedly connected to the mounting ring plate.

* * * * *